UNITED STATES PATENT OFFICE.

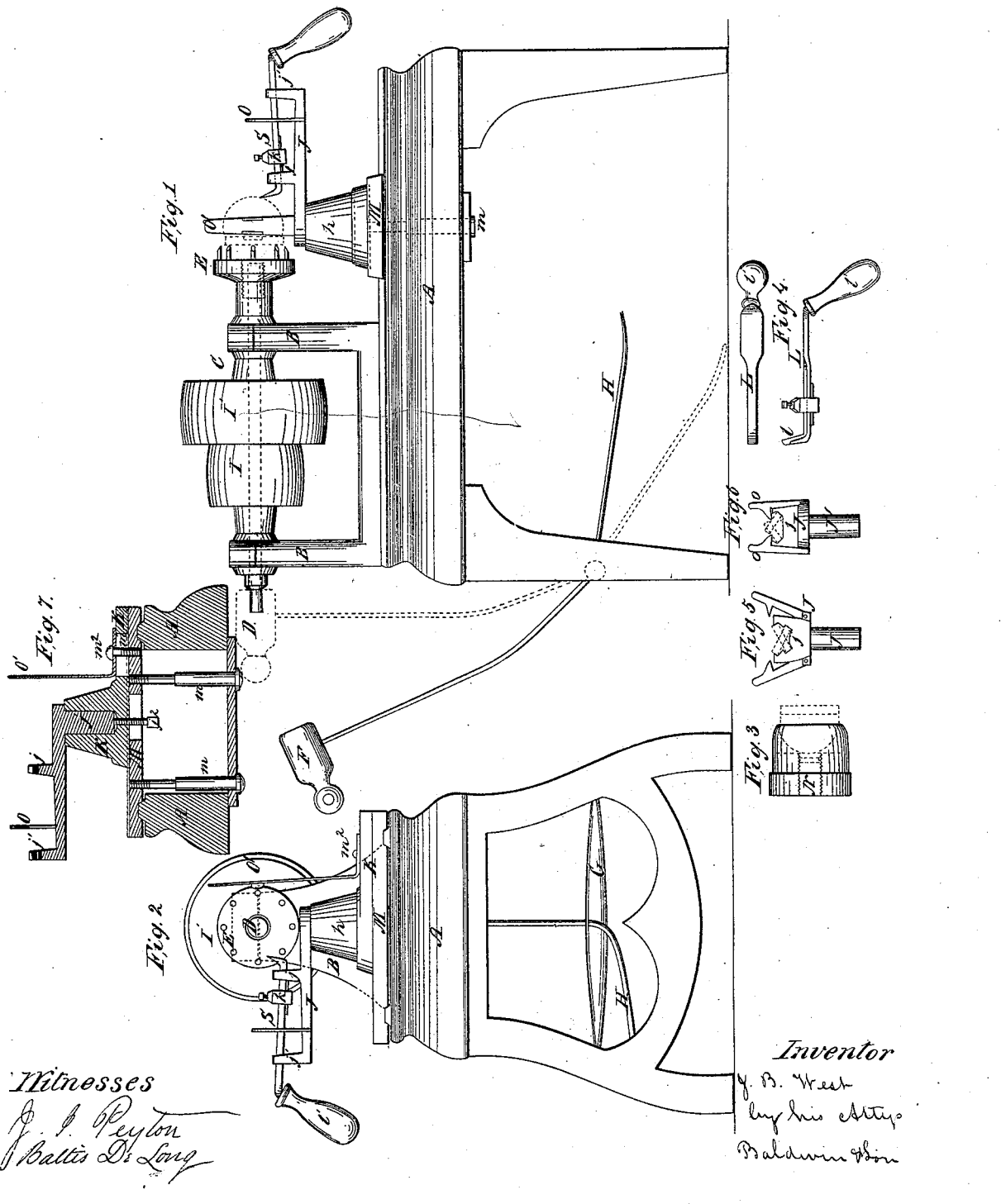

J. BURNS WEST, OF GENESEO, NEW YORK, ASSIGNOR TO SAMUEL FINLEY.

IMPROVEMENT IN LATHES FOR TURNING BALLS.

Specification forming part of Letters Patent No. 81,315, dated August 18, 1868.

*To all whom it may concern:*

Be it known that I, J. BURNS WEST, of Geneseo, in the county of Livingston and State of New York, have invented a new and useful Improvement in Lathes for Turning Balls, of which the following is a full, clear, and exact description, reference being had to the accompanying drawings, which make part of this specification, and in which—

Figure 1 represents a view, in elevation, of one side of my improved lathe, and Fig. 2 an end elevation of the same. Fig. 3 shows the chuck for holding the partially-turned ball. Fig. 4 shows the details of one of the cutting-tools. Fig. 5 is an end view of the swinging rest, as seen from the outer end, and Fig. 6 a similar view of the same, as seen from the inner end. Fig. 7 is a vertical transverse section through the rest, showing its mode of adjustment.

The invention herein claimed consists in certain novel devices for turning balls or globes.

To carry out my invention, I mount upon a suitable frame, A, a head-block, B, in which a mandrel, C, turns in suitable bearings. This mandrel is hollow, and carries a rod, D, which moves endwise to push the finished balls from the chuck E, which is also perforated. The rod D is moved by a hammer, F, vibrating on a rock-shaft, G, actuated by a pedal, H. The mandrel is driven by a band encircling its pulleys I I' in the usual way. The cutters are held in a rest, J, swinging horizontally in the arc of a circle in a socket, K, mounted on a bed-plate, M, which slides longitudinally in its bed, and is held in any desired position by clamp-screws $m$, Fig. 7. The socket-plate slides transversely in its bed, and is adjusted and held in any desired position by a slot, $m^1$, and a set-screw, $m^2$. The stem J' of the rest is adjusted vertically by a set-screw, $j^2$. I use two cutting-tools, a gouge, L, Fig. 4, for turning down the blocks, and a chisel, S, Figs. 1 and 2, for finishing the balls.

Fig. 4 shows the details of construction of my improved cutting tool or gouge, which consists of a cutting-edge, $l$, set at an angle to the shank L, which is slightly twisted longitudinally, and has a handle, $l'$, at its outer end bent down at a proper angle. This tool is supported in two standards, $j\ j^1$, having jaws notched in the form shown in Figs. 5 and 6, to hold the gouge firmly, either vertically or inclined at any angle. The tool rests in the notches, as shown in Figs. 1 and 2, and is adjusted by a stop-guide, $k$, which slides on it, and is held in any desired position by a set-screw. This stop-guide determines the size of the ball. A gage or index might be marked on the handle to secure accurate work. The tool is held in its rest by vibrating clamps O. Each cutting-tool is bent up at the front end, nearly at right angles, to secure an easy cutting position.

The operation is as follows: The gouge is secured in the rest, as shown in Figs. 1 and 2, and a cylindrical block, of a length somewhat greater than the diameter of the ball to be turned, is clamped in the chuck in any proper well-known way. The mandrel carrying the block is then rotated, and the tool gradually swung horizontally round the block in the arc of a circle. This completes about four-sixths of the circumference of the ball in the rough. The gouge is then removed, and the chisel or finishing-tool placed in the rest at an angle, by means of the notches in the rest-standards, and applied to the ball, finishing such four-sixths as follows: first, with one motion, the hemisphere of the ball, and then by changing such cutters to the left, such other sixth. The two positions of the front end of the finishing-chisel are represented in the dotted lines in Fig. 6. The holding-chuck is then removed, and the finishing-chuck N put in its place; the turned portion of the block is then inserted in this chuck, as shown in Fig. 3, and the ball finished by turning off the incomplete side with the gouge and finishing with the chisel. The operator then depresses the pedal H with his foot, which causes the hammer F to strike the sliding rod D, and pushes the ball out of its socket. The ball is driven out of the chuck E in the same way.

For croquet and other balls which it is desirable to mark, a marking-spring, O', is used. This spring is secured on the bed-plate out of contact with the ball, but is pressed up against it by hand at the proper moment for marking the ball.

It will thus be seen that in turning balls I support the block from which the ball is cut at one end only, that my chucks are perfo-
} rated, and that I use a tool mounted in a swing-rest, which has a vertical, a lateral, and a longitudinal adjustment in its socket, as well as a horizontal swinging movement across the axis of the mandrel; by which latter movement I can round one end of the block by a single traverse of the tool.

I am of course aware that hollow mandrels and swinging rests are not new, and do not, therefore, broadly claim such devices; but

What I claim as my invention, and desire to secure by Letters Patent, is—

1. The swing-rest constructed and arranged as described, for the purpose of rounding one end and the sides of the block from which the ball is cut by a single traverse of the tool across the axis of the mandrel, as set forth.

2. The combination, with the swing-rest, of the fixed notched tool-holders and swinging locking-clamps O, all these parts being constructed and operating as described, so as to hold the tool either horizontally or at an angle, as set forth.

3. The combination, with the swing-rest and locking-clamps, of the twisted gouge L, and stop-block or gage k, these parts being constructed and arranged as described, for joint operation.

4. The combination of the perforated chuck and mandrel with the pushing-rod sliding through them, and with the vibrating hammer to knock out the finished balls, these parts being constructed, arranged, and operating as described.

5. The combination, as described, with the chuck supporting the block from which the ball is to be cut at one end only of the swing-rest which carries the tool across the axis of the mandrel, as set forth.

6. The method herein described of finishing a portion of the ball somewhat greater than its hemisphere by a tool swinging transversely across the axis of rotation of the ball, (which is sustained at one end only,) and then inserting the finished end in a perforated concave chuck, and completing the remainder of the sphere by a repetition of the former swinging movement of the tool.

7. The combination, as described, with the chuck and swing-rest, of the marking-spring O', constructed and arranged as set forth.

In testimony whereof I have hereunto subscribed my name, August 15, A. D. 1867.

J. B. WEST.

Witnesses:
   SCOTT LORD,
   GEO. W. SILL.